May 18, 1926.  
E. JOHNSON  
1,584,945  
AIRPLANE POWDER DUSTING APPARATUS  
Filed Feb. 5, 1926   2 Sheets-Sheet 1
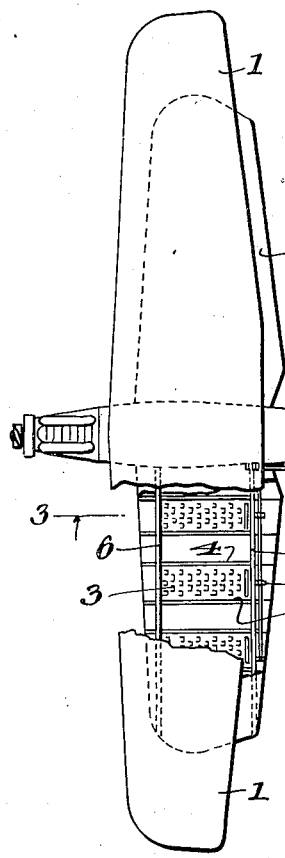
Fig. 1.
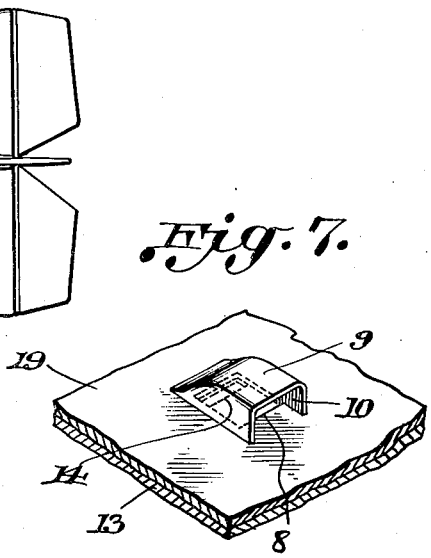
Fig. 7.
Fig. 2.
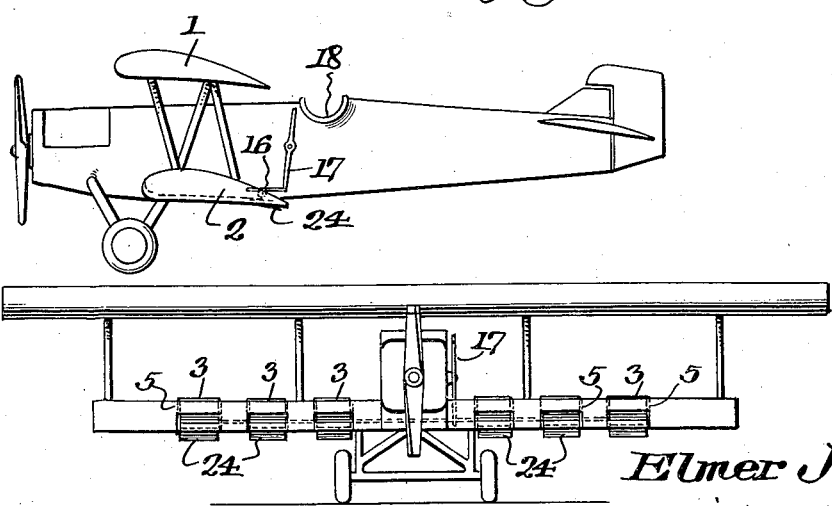
Fig. 3.
Inventor  
Elmer Johnson  
By R. W. Williams, W. Boyle, P. D. Cronin and A. J. Decker  
Attorney

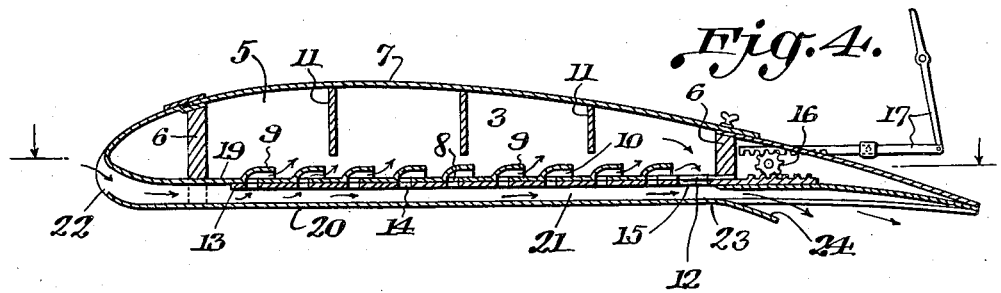
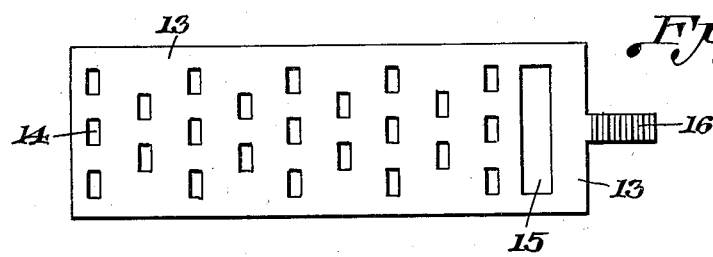
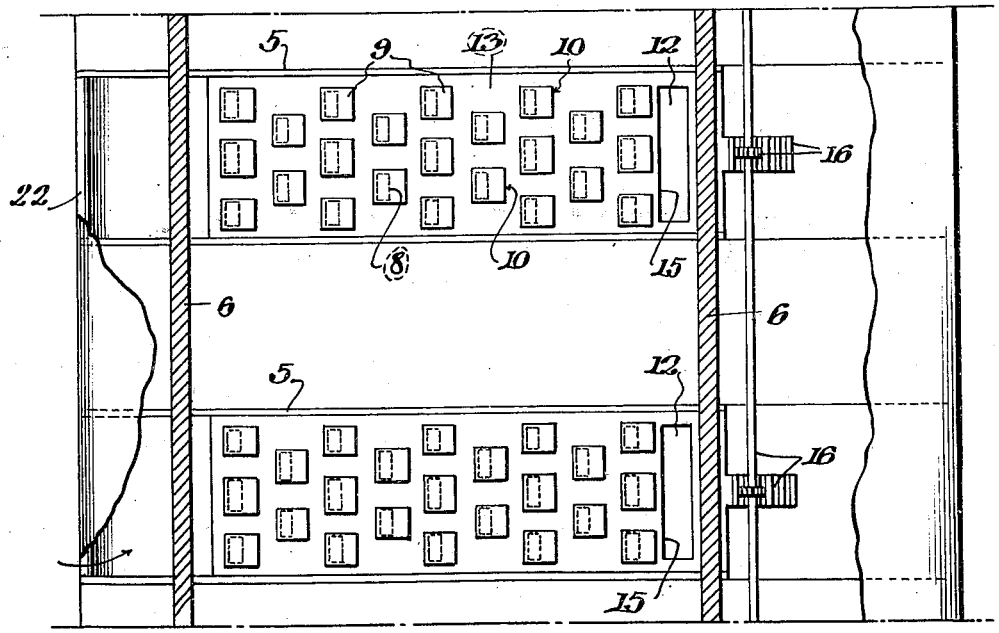

Patented May 18, 1926.

1,584,945

UNITED STATES PATENT OFFICE.

ELMER JOHNSON, OF WASHINGTON, DISTRICT OF COLUMBIA, ASSIGNOR TO THE GOVERNMENT AND THE PEOPLE OF THE UNITED STATES.

AIRPLANE POWDER-DUSTING APPARATUS.

Application filed February 5, 1926. Serial No. 86,357.

(GRANTED UNDER THE ACT OF MARCH 3, 1883; 22 STAT. L. 625.)

This application is made under the act of March 3, 1883, chapter 143 (22 Stat. 625), and the invention herein described and claimed may be used by the Government of the United States or any of its officers or employees in the prosecution of work for the Government, or by any citizen of the United States, without payment to me of any royalty thereon.

The principal object of the invention is to provide hopper means in the wings of an airplane from which granular material may be discharged into the air over areas desired to be treated with such material. A further object is to provide efficient means for withdrawing and ejecting the granular material from the hoppers in a manner to prevent the formation of lumps of the granular material and to permit of the distribution of the granular material in thin streams and in such a way that the particles of granular material are kept separate, and also to break up any lumps of the material as it issues from the hoppers.

On the drawings:

Fig. 1 is a plan view of the entire apparatus with certain parts broken away.

Fig 2 is a side elevation of the same.

Fig. 3 is a front elevation of the same.

Fig. 4 is a section of the lower wing of the airplane taken along the line 3—3 of Fig. 1.

Fig. 5 is a plan view of the valve (movable member).

Fig. 6 is a plan view of the bottom of a hopper in the wing with valve underneath it.

Fig 7 is a detail of one of the dust hoods through which air enters the hopper.

Referring to the drawings, the wings of the airplane are shown as represented by 1 and 2. Hoppers 3 adapted to carry granular material are constructed in the sections, alternately or in sequence, formed by the ribs 4 of the wing members, the side walls 5 of the hopper extending horizontally between the front and rear spar members 6 of the wing and in a vertical direction from a point near the bottom rib member to the upper rib member of the wing, the front and rear walls of the hopper being formed of the corresponding spars of the wing. The lid or cover 7 of the hopper consists of a removable plate which forms a part of the upper surface of the wing. The bottom of the hopper is provided with a plurality of air inlets 8 and with hoods 9 secured inside the hopper adjacent the air inlets 8 in such a manner that the hoods prevent granular material being discharged through inlets 8 and so that the hood openings 10 direct the air coming into the hopper through air inlets 8 toward the rear of the hopper and wing. Baffles 11 extending from one side of the hopper to the other and of any desired depth are provided in the hopper for the purpose of preventing shifting of the granular material contained in the hopper while the airplane is being maneuvered. An exit opening 12 at the rear of the hopper is provided for the discharge of granular material. A valve 13 is provided at the bottom of the hopper and is carried in suitable guides (not shown). This valve has openings 14, corresponding to the air inlets 8 in the bottom of the hopper and exit opening 15 corresponding to exit opening 12 of the hopper. The valve 13 is adapted to be moved to open or closed position by rack and pinion means 16, controlled by a system of levers 17, operated from pilot's cock pit 18. The bottom 19 of the hopper is spaced some distance from the lower surface 20 of the wing, thus forming air duct 21, between the bottom of the hopper and the bottom of the wing, the mouth 22 of which air duct is formed by cutting away a portion of the leading edge of the wing, thereby permitting the entrance of air into the duct, the duct 21 being provided with a throat 23, communicating with exit opening 12 in the hopper and a flared discharge end 24. This discharge opening 24 may be flared and the flare is adjustable and capable of being widened or deepened at its lower end to govern the direction of the flow of the dust laden air as it is discharged from the airplane.

When the airplane is in flight and valve 13 is in open position, currents of air resulting from the forward motion of the airplane enter ducts 21, pass through openings 8 in the bottom of the hopper tending to blow the granular material in the hopper toward the exit opening 12 whence it is conveyed to the throat 23 of duct 21, that portion of the current of air that continued to pass along duct 21 assuming increased velocity at the throat, tending to such powder from the hopper and also giving impetus to the dust laden air as it emerges from the hopper, hence conveys it to the discharge end 24 of the duct where it is distributed into the atmosphere. When valve 13 is in closed position, the openings 14 and 15 therein do not coincide with the openings 8 and 12 in the bottom of the hopper thus preventing the entrance of air into the hopper and also the discharge of powder therefrom.

I claim:

1. In airplane dusting apparatus, a plurality of dusting hoppers in the wing structures of the airplane, and means forming a part of the wing structures for discharging into the air granular material contained in said hoppers while the airplane is in flight.

2. In airplane dusting apparatus, a plurality of dusting hoppers in the wing structures of the airplane, the forward and rear walls of said hoppers formed from the corresponding spars of the wing, and means in the wing for discharging into the air granular material contained in said hoppers while the airplane is in flight.

3. In airplane dusting apparatus, a plurality of dusting hoppers in the wing structures of the airplane, air ducts in the wing structures beneath said hoppers, said ducts provided with mouths adapted to receive currents of air created by the motion of the airplane propeller and the forward movement of the airplane, said ducts provided with discharge outlets at the rear edge of the airplane wings, said ducts having openings communicating with discharge openings in the bottom and towards the rear of said hoppers, a plurality of openings in the bottom of said hoppers adapted to receive air passing along said ducts for the purposes of agitating granular material in said hoppers and impelling the same in the direction of the discharge outlets of said hoppers, and hoods superposed over the said plurality of openings in the bottom of the hoppers to prevent clogging of said openings with granular material in said hoppers.

ELMER JOHNSON.